(12) United States Patent
Gosi et al.

(10) Patent No.: US 9,701,167 B2
(45) Date of Patent: Jul. 11, 2017

(54) SNAP-IN VALVE FOR RUBBER WHEELS

(71) Applicant: WONDER SPA, Cremona (IT)

(72) Inventors: Matteo Gosi, Cremona (IT); Stefano Cazzanti, Cremona (IT); Andrea Capelli, Cremona (IT)

(73) Assignee: WONDER SPA, Cremona (IT)

( * ) Notice: Subject to any disclaimer, the term of this patent is extended or adjusted under 35 U.S.C. 154(b) by 42 days.

(21) Appl. No.: 14/397,927

(22) PCT Filed: May 2, 2013

(86) PCT No.: PCT/IT2013/000128
§ 371 (c)(1),
(2) Date: Oct. 30, 2014

(87) PCT Pub. No.: WO2013/164866
PCT Pub. Date: Nov. 7, 2013

(65) Prior Publication Data
US 2015/0122348 A1 May 7, 2015

(30) Foreign Application Priority Data
May 2, 2012 (IT) .............................. CR2012A0011

(51) Int. Cl.
*F16K 15/20* (2006.01)
*B60C 29/02* (2006.01)
(Continued)

(52) U.S. Cl.
CPC ............ *B60C 29/02* (2013.01); *B60C 29/005* (2013.01); *F16K 15/20* (2013.01); *F16K 27/02* (2013.01); *Y10T 137/3584* (2015.04)

(58) Field of Classification Search
CPC ... B60C 29/00; B60C 29/02; Y10T 137/3584; Y10T 137/3786
(Continued)

(56) References Cited

U.S. PATENT DOCUMENTS

| | | | | |
|---|---|---|---|---|
| 1,432,869 A | * | 10/1922 | Kraft | F16K 15/20 137/223 |
| 1,741,198 A | * | 12/1929 | McKenna | F16K 15/20 137/226 |

(Continued)

FOREIGN PATENT DOCUMENTS

| | | |
|---|---|---|
| AU | 66067 81 A | 7/1982 |
| DE | 36 23 837 A1 | 2/1987 |

OTHER PUBLICATIONS

International Search Report, dated Aug. 12, 2013, from corresponding PCT application.

*Primary Examiner* — R. K. Arundale
(74) *Attorney, Agent, or Firm* — Young & Thompson

(57) ABSTRACT

Disclosed are valves for inflating the tires of rubber wheels, in particular of vehicles, where the term vehicles is intended as motor vehicles, trucks, motorcycles or in general road transport vehicles. More in detail, the a valve (1) of snap-in type for rubber wheels includes: a hollow valve body (2) of cylindrical shape arranged for connecting the inside of the rubber wheels with the outside environment and allowing passage of air; an actuating mechanism (3) of the valve (1) arranged inside the valve body (2); a rubber ring (4), suitably shaped, arranged for partially covering the valve body (2), wherein the valve body (2) includes at least one portion (20) made of plastic material.

4 Claims, 2 Drawing Sheets

(51) Int. Cl.
*B60C 29/00* (2006.01)
*F16K 27/02* (2006.01)

(58) Field of Classification Search
USPC .......................................................... 152/427
See application file for complete search history.

(56) References Cited

U.S. PATENT DOCUMENTS

| | | | | |
|---|---|---|---|---|
| 1,772,107 | A * | 8/1930 | Nelson | F16K 15/20 137/226 |
| 2,154,255 | A * | 4/1939 | Williams | F16K 15/20 137/223 |
| 2,194,850 | A * | 3/1940 | Goff | F16K 15/20 137/223 |
| 2,240,129 | A * | 4/1941 | Broecker | F16K 15/20 137/223 |
| 2,312,679 | A * | 3/1943 | Speth | F16K 15/20 137/234.5 |
| 2,625,170 | A * | 1/1953 | Mayer | F16K 15/20 137/223 |
| 3,426,787 | A * | 2/1969 | Fuller | B60C 23/0496 137/226 |
| 3,590,851 | A * | 7/1971 | Bogossian | F16K 15/20 137/223 |
| 3,610,269 | A * | 10/1971 | Adams | B60C 23/0496 116/34 R |
| 3,712,326 | A * | 1/1973 | Thacker | F16K 15/20 137/223 |
| 3,906,988 | A * | 9/1975 | Mottram | B60C 23/0496 137/227 |
| 4,072,048 | A * | 2/1978 | Arvan | B60C 23/0496 137/228 |
| 4,171,119 | A * | 10/1979 | Lamson | B60C 29/02 137/223 |
| 4,481,970 | A * | 11/1984 | Reid | B60C 29/00 137/223 |
| 4,506,695 | A | 3/1985 | Kuypers | |
| 4,538,658 | A * | 9/1985 | Earley | B60C 29/02 137/234.5 |
| 5,027,848 | A * | 7/1991 | Leeuwen | B60C 23/0496 116/34 R |
| 5,060,685 | A * | 10/1991 | Zhabokrug | B60C 23/0496 137/230 |
| 6,247,513 | B1 * | 6/2001 | Lukins | B60C 23/02 116/34 R |
| 2005/0000568 | A1 * | 1/2005 | Nikolayev | F16L 37/23 137/231 |
| 2005/0028865 | A1 * | 2/2005 | Nikolayev | F16L 37/23 137/223 |
| 2008/0115838 | A1 * | 5/2008 | Huang | F16K 15/207 137/223 |

\* cited by examiner

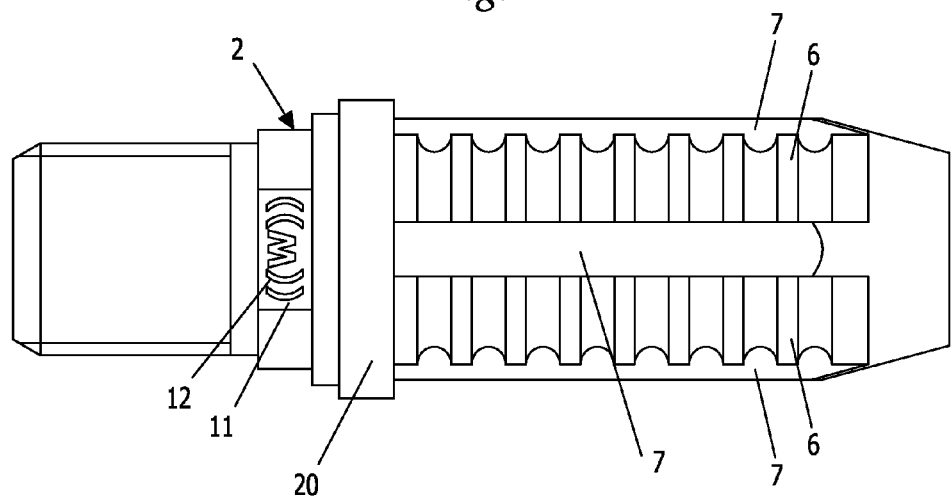
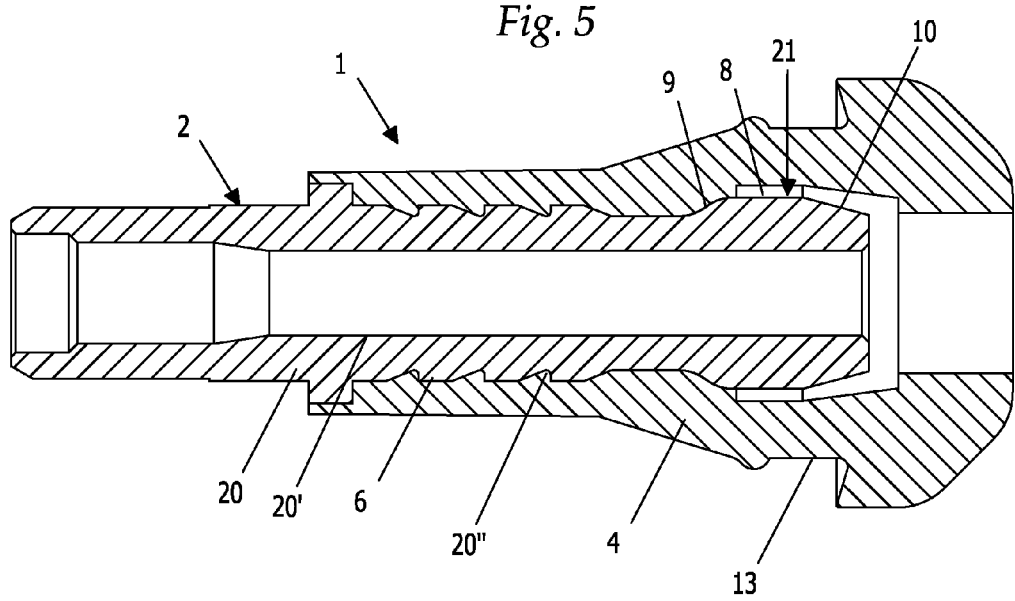

SNAP-IN VALVE FOR RUBBER WHEELS

BACKGROUND OF THE INVENTION

The present invention relates to valves for inflating the tires of rubber wheels, in particular of vehicles, where the term vehicles is intended as motor vehicles, trucks, motorcycles or in general means of transport by road.

More in detail, the invention relates to a valve of snap-in type, i.e. of the type that can be associated with the metal rim of the wheel by means of snap-in elastic locking means.

DESCRIPTION OF THE RELATED ART

These valves are generally constituted by a main body, made of a single monoblock or of several parts, of cylindrical tubular shape, acting as structural housing for an internal mechanism having the function of connecting the inside of said rubber wheels with the outside environment and of allowing, when necessary, passage of air.

The valve body is hollow and provided with an axial hole, inside which there is arranged the mechanism, which can be actuated from the outside, which ensures tightness and inflation/deflation of the tire. In particular, said axial hole has a smooth conical portion and a threaded conical portion arranged for coupling with the aforesaid mechanism. The geometry of this coupling is generally standardized.

These snap-in valves are then partially covered by a rubber ring that acts as seal when the valve is mounted on the wheel due to a hole made in the rim.

The snap-in valves used on rubber wheels have some limits and disadvantages due above all to the material with which the valve body is made, i.e. brass.

Disadvantageously, brass is a metal that, besides being costly on the market, has a rather high specific weight and therefore makes the whole valve relatively heavy.

An increase of the weight in each single valve, albeit minimum and almost negligible in relation to the overall weight of a vehicle, nonetheless implies an increase in the consumption of fuel required for movement of the same vehicle and therefore a greater economic cost and increase in the pollution rate.

The concentrated weight represented by the brass valve also generates eccentric forces relative to the rotary motion of the wheel; these forces transmitted to the rubber of the covering can damage or lacerate it until a pressure loss occurs.

Even more disadvantageously, brass is a metal particularly subject to aggression by atmospheric agents; in particular it is sensitive to corrosion when it comes into contact with the saline and acid liquids and solutions that can easily form on the road surface.

Finally, brass valves of snap-in type, therefore also provided with a rubber portion, are difficult to dispose of and recycle in one piece.

The object of the invention is to overcome these limits, producing a valve of snap-in type for rubber wheels that is extremely light, but at the same time resistant to mechanical forces, to pressure and to external aggression.

SUMMARY OF THE INVENTION

Another object of the invention is to produce a monoblock valve that is easy to dispose of and recycle.

The objects are achieved with a valve of snap-in type for rubber wheels comprising:

- a hollow valve body of cylindrical shape arranged for connecting the inside of said rubber wheels with the outside environment and allowing passage of air;
- an actuating mechanism of said valve arranged inside said valve body;
- a rubber ring, suitably shaped, arranged for partially covering said valve body,
- characterized in that said valve body comprises at least one portion made of plastic material.

According to a first embodiment of the invention, said portion is arranged to be at least partly covered by said rubber ring or by another analogous material arranged for guaranteeing pressure tightness.

According to a further embodiment of the invention, the internal surface of said portion is shaped with lobes or in any case provided with at least one continuous longitudinal groove arranged for increasing the section for passage of air inside said valve body.

According to preferred embodiments, the outer surface of said portion comprises at least one shaped annular rib, so as to increase the retention for said rubber ring, and at least one reinforcing longitudinal rib.

In particular, said at least one longitudinal rib is superimposed on said at least one shaped annular rib.

According to a further embodiment of the invention, said portion comprises a thicker shaped end, provided with a cylindrical portion comprised between two frustoconical portions or in any case an bulge.

According to an advantageous embodiment of the invention, the outer surface of said portion comprises a flat area arranged for receiving markings.

In a particularly preferred embodiment of the invention, said valve body is made entirely of plastic material.

The advantages of the invention are evident and due above all to the presence of at least one portion of the valve body made of plastic material.

Replacement of the monoblock brass valve body with a valve body partially or totally made of plastic reduces the weight of the valve considerably, as the specific weight of plastic is almost eight times lower than that of brass.

Reducing the weight of the valve implies a saving in the consumption of fuel used for movement of the vehicle and therefore minor economic cost; it also reduces the mechanical forces acting on the seal element, which is consequently in conditions of greater safety.

The costs of the valve are also considerably lower, as the use of brass, a nobler and notoriously more costly material relative to plastic, is limited or eliminated.

The valves with the body made of plastic according to the invention are also much more resistant to chemical aggression, to aggression by atmospheric agents, to corrosion, etc . . .

Moreover, monoblock valves entirely made of plastic are much easier to dispose of in one piece without operations to separate the rubber ring, therefore saving on time and further reducing costs.

The at least one groove present along the internal cylindrical surface of the valve body suitably increases the section for passage of air, also in relation to an increase in the thickness of the portion of the valve body made of plastic material required to guarantee anyway the correct mechanical strength thereof.

The shaped annular ribs on the outer lateral surface of the valve body increase the mechanical fastening of the rubber ring and the adhesion to the same valve body, and prevent loosening between the parts during mounting and removal of the valve on and from the rim of the wheel.

The longitudinal ribs on the outer lateral surface of the valve body increase the mechanical strength of the valve both during use and operation and also during molding of the rubber ring on the same body.

The thicker or in any case enlarged shape of the end of the valve body arranged for being totally encapsulated in the rubber ring, due to an increase in the thickness of a section of the valve body, besides ensuring greater reinforcement of the valve when it is inserted on the rim and a specific mounting tool is used, increases by 40% its resistance to leaks caused by the internal pressure of the rubber.

The use of plastic also facilitates, due to its molding method, the possibility of arranging, on the outer surface of the valve body, markings, signs with advertising, or signs describing the technical specifications, advantageously to be left in view.

The possibility of combining parts made of different materials (plastic-metal or different types of plastic) to produce the valve body makes it possible to exploit the advantages of the different materials (for example, the use of a metal on the thread) in different areas of the valve.

BRIEF DESCRIPTION OF THE DRAWING FIGURES

These and other advantages will be more apparent below, wherein a preferred embodiment of the invention is described by way of non-limiting example, and with the aid of the figures, wherein:

FIGS. 4 and 5 represent, respectively in a side view and in a section along an axial longitudinal plane, a valve body and a valve of snap-in type for rubber wheels according to two further embodiments of the invention.

DETAILED DESCRIPTION OF THE INVENTION

Figure 1:
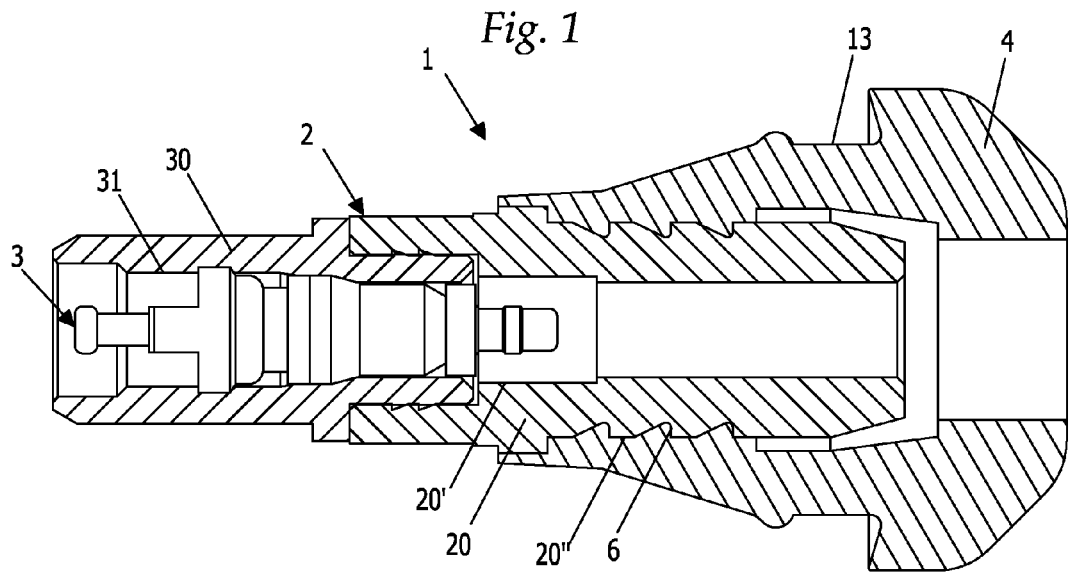
FIG. 1 represents a valve of snap-in type for rubber wheels according to the invention, sectioned along an axial longitudinal plane.

With reference to FIG. 1 there is illustrated a valve 1 of snap-in type arranged to be mounted on a rim of a rubber wheel.

Said valve 1 substantially comprises a valve body 2, also called core, an actuating mechanism 3 arranged inside said valve body 2 and a rubber ring 4 arranged for partially covering said valve body 2.

The valve body 2 has a cylindrical shape, is axially hollow and is arranged for connecting the inside of said rubber wheels with the outside environment and allowing passage of air;

In particular, said valve body 2 has a surface with external cylindrical symmetry 20" and a surface with internal cylindrical symmetry 20', this latter provided with a smooth portion and with a threaded portion to which said actuating mechanism 3 is screwed.

Said valve body 2 is partially covered by a rubber ring 4 that acts as seal when the valve 1 is mounted on the wheel due to cooperation between an annular groove 13 of the rubber ring 4 and a hole made in the metal rim of the same wheel.

The valve body 2 illustrated in FIG. 1 is composed of, i.e. it comprises, a portion, again made of plastic material 20 and a portion 30 made, in relation to specific applications, of different material, preferably metal, such as brass or aluminum, or of another type of plastic.

In particular, the portion made of metal material 30 is the one provided with internal thread 31 for screwing of the actuating mechanism 3, while the plastic portion 20 is that arranged to be covered at least partly by said rubber ring 4.

Figure 2:
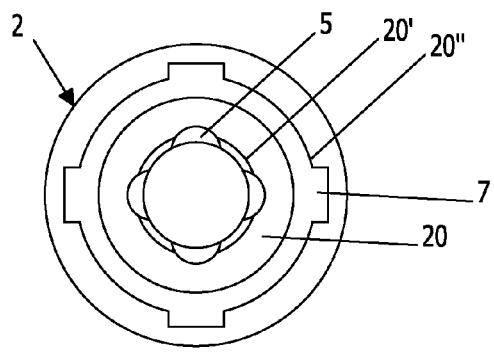
FIGS. 2-3 represent, respectively in a front view and in an axonometric view, a portion of the valve body, according to a possible embodiment.
Figure 3:
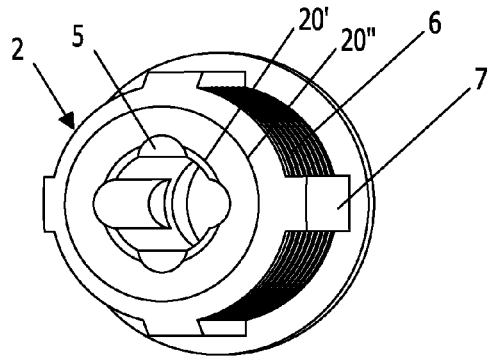

With reference to FIGS. 2 and 3, the internal surface 20' of said plastic portion 20 is provided with a plurality of continuous longitudinal grooves 5 arranged for increasing the section for passage of air inside said valve body 2.

In a preferred embodiment the grooves 5 are four, lobe shaped and arranged in a cross, to ensure maximum uniformity of passage of air without excessive weakening of the valve body.

The outer surface 20" of the portion 20 of valve body arranged to be covered by the rubber ring 4 comprises a plurality of saw-edge shaped annular ribs 6.

Said ribs 6 have the object of increasing the retaining force for said rubber ring 4 and preventing loosening between the parts during mounting of the valve 1 on the rim of the wheel.

The same outer cylindrical surface 20" also comprises a plurality of reinforcing longitudinal ribs 7, which are superimposed on said shaped annular ribs 6.

With reference to the variant illustrated in FIGS. 4 and 5, the valves illustrated are provided with a monoblock valve body 2, made entirely of plastic material.

FIG. 4 in particular shows four longitudinal ribs 7 arranged in a cross to ensure uniform reinforcement of the structure of the valve body 2.

The external surface 20" of said valve body 2 made of plastic can also comprise a flat area 11 arranged for receiving markings 12, such as the manufacturer's trademark or any codes referring to the technical specifications of the product or standards of reference.

As shown particularly in FIG. 5, said plastic portion 20 of said valve body 2 comprises an enlarged end 21, goblet or cup shaped, or in any case thicker in shape.

Said end 21 is arranged for being incorporated inside said rubber ring 4.

Said end 21 is preferably provided with a cylindrical portion 8 comprised between two frustoconical portions 9 and 10.

The central cylindrical portion 8 corresponds to a thickening of the valve body 2, due to an increase in its thickness, very advantageous from the point of view of mechanical strength during mounting and of burst strength.

In particular, said valve enables protective caps (not illustrated) to be screwed onto the external thread present on the front part of the main body in the same way as standard snap-in valves.

Operation of the snap-in valve 1 for rubber wheels with body made partly or entirely of plastic according to the invention, together with its assembly methods and operations for mounting on the wheel, besides complying with all legal requirements, are identical to the operation, assembly and mounting of conventional snap-in valves.

The invention claimed is:

1. A valve (1) of snap-in type for a rubber wheel mounted on a metal rim, said valve (1) comprising:
    a valve body (2) of cylindrical shape and axially hollow, said valve body (2) arranged for connecting an inside of said rubber wheel with an outside environment and allowing passage of air, said valve body (2) having a first end that in use would be located inside of said rubber wheel and a second end that in use would be located outside of said rubber wheel, said valve body (2) being of a plastic material;
an actuating mechanism housing (30) located partly within the valve body (2) and extending beyond the second end of the valve body (2), the actuating mechanism housing (30) having an outer surface extending into the second end of the valve body (2) and contacting an inner surface of the second end of the valve body (2), the actuating mechanism housing (30) comprising an axially hollow space with an internal thread (31);
an actuating mechanism (3) located within the axially hollow space of said actuating mechanism housing (30), the actuating mechanism (3) being screwed onto the internal thread (31) of the actuating mechanism housing (30); and
a rubber ring (4) partially covering an outside surface of said valve body (2), said rubber ring (4) comprising a annular groove (13) that in use would engage a hole made in the metal rim of the wheel such that in use the rubber ring (4) would be located both outside and inside of said rubber wheel,
wherein along a cross-section of the valve containing the annular groove (13), said first end (21) of said valve body (2) comprises a cylindrical portion (8) in series with a frustoconical portion (10), the cylindrical portion (8) and the frustoconical portion (10) being spaced apart and free of contact with an adjacent inside surface of the rubber ring (4).

2. A valve (1) of snap-in type for a rubber wheel mounted on a metal rim, said valve (1) comprising:
a valve body (2) of cylindrical shape and axially hollow, said valve body (2) arranged for connecting an inside of said rubber wheel with an outside environment and allowing passage of air, said valve body (2) having a first end that in use would be located inside of said rubber wheel and a second end that in use would be located outside of said rubber wheel, said valve body (2) being of a plastic material;
an actuating mechanism housing (30) located partly within the valve body (2) and extending beyond the second end of the valve body (2), the actuating mechanism housing (30) having an outer surface extending into the second end of the valve body (2) and contacting an inner surface of the second end of the valve body (2), the actuating mechanism housing (30) comprising an axially hollow space with an internal thread (31);
an actuating mechanism (3) located within the axially hollow space of said actuating mechanism housing (30), the actuating mechanism (3) being screwed onto the internal thread (31) of the actuating mechanism housing (30); and
a rubber ring (4) partially covering an outside surface of said valve body (2), said rubber ring (4) comprising a annular groove (13) that in use would engage a hole made in the metal rim of the wheel such that in use the rubber ring (4) would be located both outside and inside of said rubber wheel,
wherein said first end (21) of said valve body (2) terminates with a cylindrical portion (8) in series with a frustoconical portion (10), the cylindrical portion (8) and the frustoconical portion (10) being spaced apart and free of contact with an adjacent interior part of the rubber ring (4) comprised of an adjacent first inside surface of a first diameter joined to a second tapered inside surface of decreasing diameter joined to a third inside side of a second diameter less than the first diameter.

3. A valve (1) of snap-in type for a rubber wheel mounted on a metal rim, said valve (1) comprising:
a valve body (2) of cylindrical shape and axially hollow, said valve body (2) arranged for connecting an inside of said rubber wheel with an outside environment and allowing passage of air, said valve body (2) having a first end that in use would be located inside of said rubber wheel and a second end that in use would be located outside of said rubber wheel, said valve body (2) being of a plastic material;
an actuating mechanism (3) located within the second end of the axially hollow space of said valve body (2); and
a rubber ring (4) partially covering an outside surface of said valve body (2), said rubber ring (4) comprising a annular groove (13) that in use would engage a hole made in the metal rim of the wheel such that in use the rubber ring (4) would be located both outside and inside of said rubber wheel, wherein,
along a cross-section of the valve containing the annular groove (13), said first end (21) of said valve body (2) comprises a cylindrical portion (8) located between first and second frustoconical portions (9, 10), and
said first end (21) of said valve body (2) terminates with the cylindrical portion (8) and the second frustoconical portion (10), the cylindrical portion (8) being in series with the second frustoconical portion (10), the cylindrical portion (8) and the second frustoconical portion (10) being spaced apart and free of contact with an adjacent surface of the rubber ring (4) comprised of an adjacent first inside surface of a first diameter joined to a second tapered inside surface of decreasing diameter joined to a third inside side of a second diameter less than the first diameter.

4. A valve (1) of snap-in type for a rubber wheel mounted on a metal rim, said valve (1) comprising:
an axially hollow valve body (2) arranged for connecting an inside of said rubber wheel with an outside environment and allowing passage of air, said valve body (2) having a first end that in use would be located inside of said rubber wheel and a second end that in use would be located outside of said rubber wheel, said valve body (2) being made entirely of a plastic material;
a rubber ring (4) partially covering an outside surface of said valve body (2), said rubber ring (4) comprising a annular groove (13) that in use would engage a hole made in the metal rim of the wheel such that in use the rubber ring (4) would be located both outside and inside of said rubber wheel;
an actuating mechanism housing (30) located partly within the valve body (2) and extending beyond the second end of the valve body (2), the actuating mechanism housing (30) extending into the second end of the valve body (2) and contacting an inner surface of the second end of the valve body (2), the actuating mechanism housing (30) comprising an axially hollow space with an internal screw thread; and
an actuating mechanism (3) screwed onto the internal screw thread of the axially hollow space of said actuating mechanism housing (30), wherein,
along a cross-section of the valve containing the annular groove (13), said first end (21) of said valve body (2) comprises a cylindrical portion (8) in series with a frustoconical portion (10), the cylindrical portion (8) and the frustoconical portion (10) being spaced apart and free of contact with an adjacent inside surface of the rubber ring (4), said actuating mechanism housing (30) terminates within a portion of the second end of the valve body (2) not covered by said rubber ring (4), and said first end (21) of said valve body (2) terminates with the cylindrical portion (8) in series with the frustoconical portion (10), the cylindrical portion (8) and the frustoconical portion (10) being spaced apart and free of contact with the adjacent surface of the rubber ring (4) comprised of an adjacent first inside surface of a first diameter joined to a second tapered inside surface of decreasing diameter joined to a third inside side of a second diameter less than the first diameter.

* * * * *